Aug. 27, 1968
L. H. OTT ET AL
3,399,359
SOLID-STATE LASER
Filed March 1, 1965
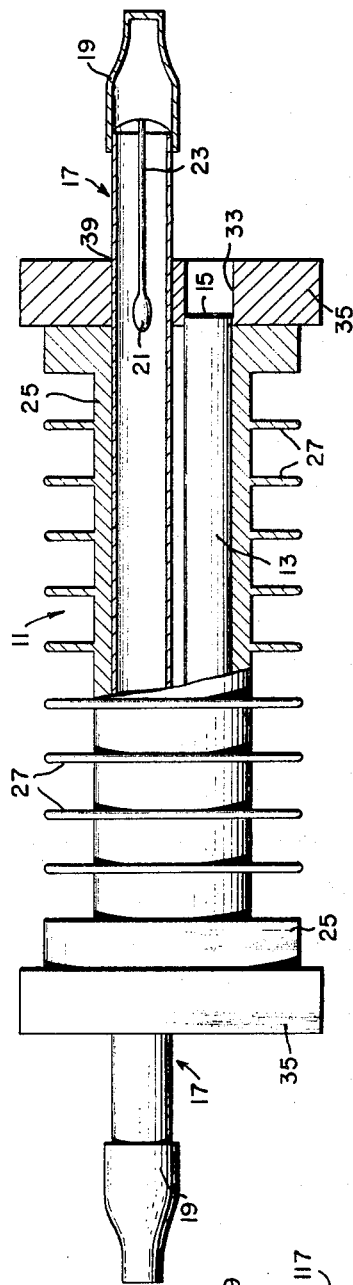
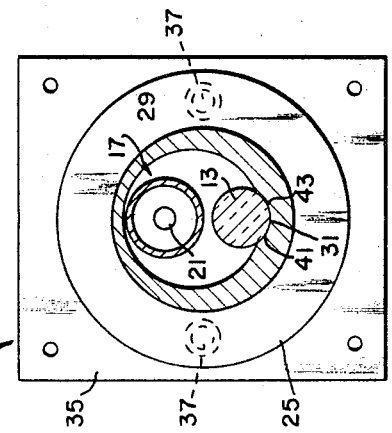
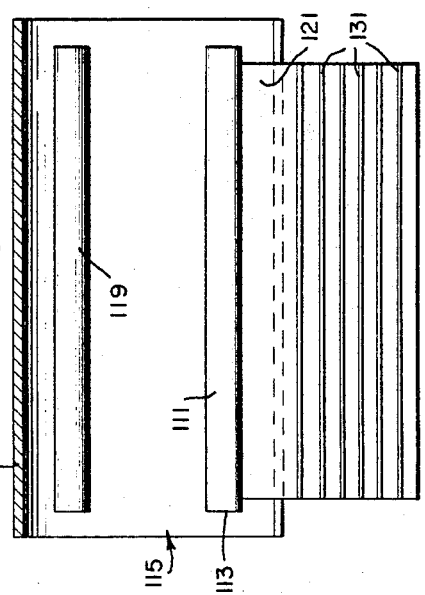
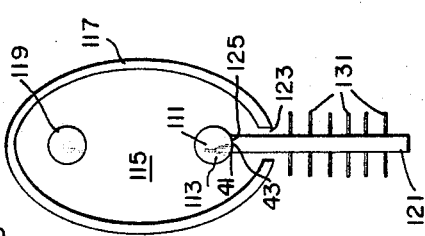
Lawrence H. Ott,
Robert S. Congleton,
INVENTORS.
BY.
*J. K. Haskell*
ATTORNEY.

United States Patent Office 3,399,359
Patented Aug. 27, 1968

3,399,359
SOLID-STATE LASER
Lawrence H. Ott, Altadena, and Robert S. Congleton, Canoga Park, Calif., assignors to Hughes Aircraft Company, Culver City, Calif., a corporation of Delaware
Filed Mar. 1, 1965, Ser. No. 436,221
18 Claims. (Cl. 331—94.5)

This invention relates to a solid-state laser and more particularly to a solid-state laser wherein a thermally conductive material is utilized to join an active solid-state laser element to a thermally conducting member.

In order to produce laser action in an active laser element, a certain minimum pump energy must be supplied per unit volume of the solid laseable material and it must be supplied above a minimum rate sufficient to overcome spontaneous decay. However, the energy absorbed in the solid material is only a small fraction of the radiative output of the pump generator, such as a xenon gas lamp. This is due to the fact that a certain amount of the pump energy will not reach the solid laseable material because not all of this energy can be directed into the material and, of that amount which does, only radiative energy in the proper absorption region for the particular material used is effective in providing the excitation necessary for laser action. The energy not utilized in excitation of the laseable material takes the form of heat which, if not directed away from the material, will cause the laser action to deteriorate and to eventually cease. This heat barrier of the active laser element has been fully discussed in connection with ruby in an article entitled, "Effects of Elevated Temperatures on the Fluorescence and Optical Maser Action of Ruby" by James P. Wittke, published in the Journal of Applied Physics, vol. 33, No. 7, July 1962, and is applicable to other laseable material.

In the area of Q switching lasers, such as used in laser range finders, for example, it has been found vital for efficient laser operation to regulate the temperature of a ruby laser element, for example, to the range of about 30°±10° C. for optimum energy output and fast repetitive firing rate. At lower temperatures the control of laser pulses becomes difficult and at elevated temperatures the intensity of the emitted beam falls off considerably and eventually, as noted above, laser action will cease.

In attempting to overcome this problem, scientists have utilized various techniques such as forced air cooling. However, it has been found that air is an extremely inefficient coolant and that there is a tendency for the polished interior of the pump cavity surrounding the pump lamp and the laseable material to tarnish and thus become less efficient in directing the pump energy to the active laser element. Furthermore, for airborne laser systems this method is cumbersome and inefficient since the air must be supplied by some kind of mechanical refrigeration equipment. Small mechanical refrigerators are expensive, have limited life, tend to be heavy, and occupy excessive space. The air supplied by such a cooling system must be conducted through flexible tubing and pressure drops and thermal losses along the way must be contended with. Also, a prime difficulty with the air system is the problem of regulating the temperature from the cooling to the heating mode.

Another approach in an attempt to solve this problem has been in the design of the laser pump cavity configuration under the theory that if a substantial portion of the optical pump energy can be directed or focused on the active laser element in the form of a rod, less pump energy will be wasted in directly heating the pump cavity. One example of this is the use of an elliptical pump cavity configuration wherein the pump lamp lies along one of the focal lines of the elliptical cylinder and the active laser element in the form of a rod lies along the other focal line. This configuration provides good focusing characteristics but results in a large air space between the laser rod and the cavity inner wall. When this laser is operated at a high repetition rate, the laser element becomes extremely hot and soon stops lasing since there is a very poor thermal path to conduct the heat away from the laser rod.

Another example of this approach was the placing of the pump flash lamp and the ruby rod in close proximity to each other, surrounded by such materials as aluminum foil or magnesium oxide. This arrangement is called "close coupling." The efficiency was found to be good, but like the elliptical cavity, this technique did not supply an adequate heat sink and resulted in high heat buildup in the laser rod.

One solution was to include in a focused type pump cavity structure an externally extending thermally conducting pedestal in thermally conductive contact with a longitudinal portion of the surface of a solid-state laser rod also disposed in the cavity (see copending application Ser. No. 422,644). Another solution was to partially embed a longitudinal portion of the surface of a solid-state laser rod in the highly reflective inner wall surface of a pump cavity structure (see copending application Ser. No. 410,507).

In both of these devices directed to the major difficulty of heat control, a new problem arose—that of good thermal conductivity between the solid-state element and the thermally conducting member to which it is in contact. Only with good thermal contact will the two devices described above provide the most advantageous results.

In working on this latest problem, it was found that the rubies supplied by the various manufacturers vary slightly in size and surface finish so that intimate thermal contact between the crystals and their supporting member was not generally attainable. That is, a small air gap existed between the two, and this has an insulating effect.

In the previously described thermally controlled lasers, one method that was used to insure a good thermal contact between a cylindrical ruby crystal (active laser element) and a copper pedestal (or a groove in the inner wall of a pump cavity structure) and eliminate the air gap was to metallize a narrow linear strip on the ruby surface by firing, evaporating, or sputtering a thin film of metal such as silver, copper, gold, etc. and soldering the ruby to the thermally conducting member. This generally followed the well-known concept that a good mechanically soldered joint would provide a good thermal path.

In subsequent experiments utilizing this soldering method, however, a definite disadvantageous result was noted. It was found that metallizing a ruby is somewhat difficult and costly. It was further discovered that some internal strains developed in the ruby due to the difference in the coefficient of thermal expansion between the ruby and the metal. This strain was found to lower the laser energy output. Other metals that more nearly matched this expansion coefficient for ruby (such as Kovar and tungsten) were used, but these metals proved to have lower than desired thermal conductivity and were therefore not as efficient. Also, another disadvantage was found to be the difficulty in replacing a soldered laser element. This would prove to be a very serious problem in field operations.

Contrary to the manner in which good thermally conductive joints were provided, according to one embodiment of the present invention, a thin layer of a stable bright metal such as gallium or a gallium alloy is utilized between the solid-state laser rod and the thermally conductive member to provide a good thermally conductive joint that does not place a strain on the laser rod and at the same time acts as a mirror surface to provide better pumping efficiency.

Gallium is a silver-white metal that has a long liquid range (melting point is 28.78° C.—boiling point is 2403° C.) and a low vapor pressure even at high temperatures (only 1 mm. Hg at 1315° C.). It has also been found to have a high reflectivity to incident light and wet metals and other materials including glass and ruby crystals. However, gallium is not an extensively used metal because of its notorious quality of aggressively attacking metals with which it comes into contact. Notwithstanding this long prejudice in the art against the extensive use of gallium, the present invention takes advantage of the other characteristics of gallium, such as long liquid range, high reflectivity and goot heat conductivity, while taking precautions to prevent the attack on the metal upon which it is disposed. For example, according to one embodiment of the invention, an active laser ruby rod is supported on a grooved edge of a thermally conductive copper pedestal between which components a thin layer of gallium or gallium alloy is disposed; and in order to prevent the attack by the gallium on the copper pedestal, a thin coating of nickel is plated on the surface of the groove.

From the preceding, it should be evident that a solid-state laser incorporating the technique of placing a longitudinal portion of an active laser element in good thermal contact with a thermally conductive member without introducing strain to the laser element would be a substantial step forward in the laser art.

It is therefore an object of the present invention to provide a solid-state laser incorporating an improved means for joining an active laser element to a thermally conducting member.

It is another object of the invention to provide a solid state laser wherein a material is used between an active laser element and a thermally conducting member that insures a good thermal path between the element and the member but does not cause strains on the laser element.

The invention and specific embodiments thereof will be described hereinafter by way of example and with reference to the accompanying drawing wherein like reference numerals refer to like elements or parts, and in which:

FIG. 1 is a side view, partially broken away of an embodiment of a solid-state laser according to the invention;

FIG. 2 is a sectional view of the laser shown in FIG. 1 taken along A—A;

FIG. 3 illustrates a side view of another embodiment of the invention; and

FIG. 4 is a cross sectional view of the laser of FIG. 3.

With reference now to the drawing and in particular to FIGS. 1 and 2, there is here illustrated a solid-state laser designated generally by the reference numeral 11. The laser 11 comprises a solid-state laser rod such as a ruby rod 13 disposed in an optical resonant cavity, which in this arrangement consists of silvered mirrors 15 (only one shown) plated on the ends of the rod 13, or it may consist of two conventional external mirrors (not shown) which reflect laser energy produced by the rod 13 to support laser action. At least one of these mirrors is partially transmissive to provide a useful laser output. A conventional tubular pump xenon flash lamp 17 is shown positioned adjacent and parallel to the rod 13 and has anode terminals 19 on each end thereof connected to a source of electrical pump energy such as a capacitor bank or shaped pulse power supply well known in the art and not illustrated herein for the sake of simplicity. The flash lamp 17 includes anode electrodes 21 (only one shown) disposed at each end thereof and connected by wires 23 to the terminals 19. Surrounding both the laser rod 13 and the flash lamp 17 is an aluminum pump cavity structure 25 including a plurality of cooling fins 27 and a highly reflective polished inner wall surface 29. The pump structure 25 also includes a groove 31 shaped to accept a longitudinal portion of the surface of the laser rod 13. The laser rod 13 is held in contact with the surface of the groove 31 in this embodiment by holes 33 in similar end blocks 35 attached to the pump structure 25 by screws 37. The end blocks 35 are also provided with holes 39 in order to hold the flash tube 17 in a position parallel and relatively close to the laser rod 13. The pump structure 25 is fabricated from aluminum, but any good heat conducting material may be used.

The laser rod 13 is assured of a good thermal path to the groove 31 of the pump structure 25 by the deposition of a thin layer of a stable bright metal 41 such as a layer of gallium or gallium alloy, to be discussed later, between the laser rod 13 and a groove portion 31 of the pump structure 25. In order to prevent any possible attack by the gallium on the aluminum of the pump structure 25, a thin layer of a thermally conducting metal 43 such as nickel or rhodium or a nickel/rhodium combination that is resistive to attack by gallium is plated on the surface of the groove 31. The layers 41 and 43 are of the order of approximately 200 millionths of an inch thick for the former and 10 millionths of an inch for the latter and, thus, are not shown in detail in FIG. 2. Of course, the necessity for the use of resistive metal would be obviated where the pump structure 25 were fabricated from a material that was itself resistant to attack from gallium or its alloys. The gallium layer 41, having a good light reflectivity characteristic, is extremely advantageous in this application because it provides a mirror-like surface to that portion of a laser rod 13 in contact with the groove 31 to increase the pumping efficiency of the laser level. Thus, by keeping a portion of the circumference area of the ruby rod 13 in good thermal contact with the pump cavity structure 25, enough heat can be removed to operate the ruby rod 13 at a high repetition rate, for example. The aluminum structure 25 itself acts as a heat sink for the ruby and is in turn cooled at its outer surface by conventional means such as allowing Freon to evaporate in the area of the fins 27.

From FIG. 2, it can be seen that the ruby rod 13 and flash lamp 17 are in close proximity to each other and therefore may be considered to be in "close coupled" configuration. The close coupling technique is well known in the art for its high pumping efficiency and in this embodiment is combined with the advantage provided by the use of gallium between the laser rod 13 and the pump structure 25 to provide a very efficient and useful device.

With reference now to FIGS. 3 and 4, there is shown a solid-state laser according to another embodiment of the invention. Here, a solid-state laser cylindrical rod 111 of chromium-doped sapphire (pink ruby) is situated within an optical resonant cavity comprising two deposited reflecting surfaces 113 of silver. One of the reflecting surfaces 113 is a heavier deposit than the other and therefore transmits less light frequency energy. The laser rod 111 is disposed along one focal line (not shown) of an elliptical focused type polished reflective pumping cavity 115 of an aluminum pump cavity structure 117. Lying along the other focal line of the pumping cavity 115 is a linear electronic flash tube or lamp 119 for producing light frequency pump energy when connected to an appropriate pulsed power source (not shown). The laser rod 111 is supported along substantially its length by a thermally conducting pedestal 121 which extends outside the pumping cavity 115 through a corresponding opening 123 in the elliptical pump cavity structure 117 on the side of the laser rod 111 opposite from the lamp 119. As shown, the pedestal 121 is thermally insulated from the structure 117. In order to provide an exceptionally good thermal path between the laser rod 111 and the pedestal 121, the metal layers 41 and 43 (described in connection with FIGS. 1 and 2) are disposed in the manner described between the laser rod 111 and an upper grooved surface or edge 125 of the pedestal 121 adjacent the laser rod 111.

In operation, when the lamp 119 is discharged or fired, essentially all of its luminous energy, both direct and reflective, impinges on the ruby rod 111 and its internal energy is elevated to an excited state. When thus excited, the ruby discharges this stored energy as an intense beam of monochromatic and coherent light, generally of extremely short duration and through at least one of the reflecting surfaces 113.

Through this laser action, the ruby rod 111 becomes warm due to the absorption of luminous and thermal energy from the lamp 119. However, by the use of a bidirectional thermally conductive path between the laser rod 111 and the pedestal 121, the temperature of the laser rod may be regulated for operation in any desired thermal range.

In one of the devices tested and shown in FIGS. 3 and 4, the laser rod 111 having a diameter of ¼ inch and a length of 2½ inches is attached to the grooved upper edge 125 of a sheet of copper (pedestal 121) approximately 0.090 inch thick. This copper pedestal in conjunction with the layer of bright metal 41 and a thin layer of protective metal 43 serves as the bidirectional thermally conducting path from the laser rod 111 to a thermally radiating area or regulators outside the cavity 115 such as the fins 131.

If under a particular type of operation, only a moderate amount of cooling is necessary, the extension of a fairly large surface of the pedestal 121 outside the pumping cavity structure 117 will be sufficient and the radiating fins 131 will not be required. However, for more cooling ability, the conventional air fins 131 may be attached as shown in the figure. In the event that even more cooling ability is needed or if temperature range control is desired, a conventional water jacket or thermal electric type cooling means may be attached to the pedestal 121. The water jacket and thermal electric cooling means mentioned above are well known and for that reason will not be described herein.

In operating the above-described embodiments, it was found to be advantageous to have the gallium in the liquid phase throughout the operating temperature range of the active laser element. At 30° C. and higher, the gallium is liquid but not at the lower temperatures. In order to extend the liquid phase of the material below 30° C., the gallium was alloyed with a smaller amount of indium metal or with tin. A gallium-indium alloy, 85:15 composition melts at approximately 20° C.; a gallium-tin alloy, 97:3 composition melts at about the same temperature. It thus may be preferred to use either of these alloys in place of pure gallium metal.

In laboratory tests to determine the thermal resistance across the ruby/pedestal contact joint with and without gallium or its alloys, that is, a dry contact joint and the same joint with gallium in place, a ruby of size ¼ inch diameter x 2½ inches long was mounted on a copper pedestal. The contact between the two was especially good, which would favor the dry contact as the joint was lapped with pumice and water. The ruby was warmed with a calibrated source to simulate heating due to laser operation. The heat flow path was from the crystal, across the junction, to the pedestal and then to a water-cooled heat sink. Seven thermocouples measured the temperatures at pertinent points when a steady state had been attained.

It was found that the thermal resistance across the dry joint was 1.2° F./watt per square inch and about 0.6° F./watt per square inch with gallium in place. A good thermally conducting silicon grease commonly used in thermoelectric applications was also run and the results were about the same as the gallium tests. However, the grease cannot be used in this application because it is decomposed photochemically in the laser cavity.

From the foregoing, it can be seen that the main advantage obtained by using gallium or one of its alloys mentioned above is that it lowers the thermal resistance between the active laser element and the heat sink to which it is in contact. Also, this material has a unique set of properties for this particular application. As a liquid contact is most desirable, its melting point is in the middle of the operating temperature range of the most widely used solid-state laser materials, ruby. The melting point can be lowered by alloying with a small amount of either indium or tin. The vapor pressure is extremely low and thus will not evaporate or contaminate the cavity. It also wets both ruby and metal and cannot be easily displaced from the joint by shock or vibration. Furthermore, it provides a good reflecting surface and returns light to the active laser element.

In practicing the invention, solid-state active laser materials other than ruby may be substituted for the ruby rod described; however, the active laser material should have relatively good thermal conducting properties to take advantage of the good thermal path provided by the gallium layer and the heat conductive means in contact therewith. Of course, other types of flash tubes than the xenon lamp shown may be used. Also, as described in conjunction with FIGS. 1 and 2, the optical resonant cavity may be comprised of detached reflectors or may be dielectric flats instead of the silvered reflecting surfaces 113, for example.

Accordingly, it is intended that the foregoing disclosure and the drawings shall be considered only as illustrations of the principles of this invention and are not to be construed in a limiting sense.

What is claimed is:

1. A solid-state laser, comprising: a cylindrical active laser rod having a longitudinal axis; a pair of reflecting elements disposed about said laser rod to reflect laser energy therethrough essentially parallel to said axis, at least one of said reflecting elements being partially transmissive of said laser energy; pump energy means including a pump lamp for producing light frequency pump energy; pump cavity means including a pump cavity structure having a pumping cavity enclosing said lamp and said laser rod for directing a portion of said pump energy at said laser rod; thermally conductive means coupled to a longitudinal portion of the surface of said laser rod for providing a bidirectional thermally conductive path for said laser rod; and a thin layer of a stable bright metal disposed between and wetting said laser rod and said conductive means, said metal having a high coefficient of thermal conductivity, a low vapor pressure and remains in a liquid state at the operating temperatures of said laser rod.

2. A solid-state laser, comprising: a cylindrical active laser rod having a longitudinal axis; a pair of reflecting elements disposed about said laser rod to reflect laser energy therethrough essentially parallel to said axis, at least one of said reflecting elements being partially transmissive of said laser energy; pump energy means including a pump lamp for producing light frequency pump energy; pump cavity means including a pump cavity structure having a pumping cavity enclosing said lamp and said laser rod for directing a portion of said pump energy at said laser rod; thermally conductive means coupled to a longitudinal portion of the surface of said laser rod for providing a bidirectional thermally conductive path for said laser rod; a thin layer of a stable bright metal disposed between said laser rod and said conductive means and wetting said longitudinal portion of said laser rod, said metal having a high coefficient of thermal conductivity, a low vapor pressure and remains in a liquid state at the operating temperatures of said laser rod; and a thin coating of a thermally conducting metal resistive to attack by said stable bright metal disposed between and in contact with said heat conductive means and said stable bright metal.

3. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear gas vapor flash lamp; a pump cavity structure with a pumping cavity, said pumping cavity enclosing both said lamp and said laser rod; thermally conductive means coupled to a longitudinal portion of the surface of said laser rod for providing a bidirectional thermally conductive path for said laser rod; and a thin layer of gallium disposed between and in contact with said laser rod and said thermally conductive means.

4. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear gas vapor flash lamp; a pump cavity structure with a pumping cavity, said pumping cavity enclosing both said lamp and said laser rod; thermally conductive means coupled to a longitudinal portion of the surface of said laser rod for providing a bidirectional thermally conductive path for said laser rod; and a thin layer of a gallium-tin alloy disposed between and in contact with said laser rod and said thermally conductive means.

5. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear gas vapor flash lamp; a pump cavity structure with a pumping cavity, said pumping cavity enclosing both said lamp and said laser rod; thermally conductive means coupled to a longitudinal portion of the surface of said laser rod for providing a bidirectional thermally conductive path for said laser rod; and a thin layer of a gallium-lithium alloy disposed between and in contact with said laser rod and said thermally conductive means.

6. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear gas vapor flash lamp; a pump cavity structure with a pumping cavity, said pumping cavity enclosing both said lamp and said laser rod; thermally conductive means coupled to a longitudinal portion of the surface of said laser rod for providing a bidirectional thermally conductive path for said laser rod; and a thin layer of a gallium-indium alloy disposed between and in contact with said laser rod and said thermally conductive means.

7. A solid-state laser, comprising: a cylindrical ruby laser rod having a longitudinal axis; a pair of dielectric coated reflecting elements disposed about said laser rod and adapted to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; a copper pedestal plate, one edge of which being adapted to support a longitudinal portion of the surface of said laser rod, said pedestal being thermally insulated from and extending outside said cavity structure in a direction away from said lamp in a plane including both said lamp and said laser rod; and a thin layer of gallium disposed between and in contact with said laser rod and said pedestal.

8. A solid-state laser, comprising: a cylindrical ruby laser rod having a longitudinal axis; a pair of dielectric coated reflecting elements disposed about said laser rod and adapted to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; a copper pedestal plate, one edge of which being adapted to support a longitudinal portion of the surface of said laser rod, said pedestal being thermally insulated from and extending outside said cavity structure in a direction away from said lamp in a plane including both said lamp and said laser rod; and a thin layer of a gallium-tin alloy disposed between and in contact with said laser rod and said pedestal.

9. A solid-state laser, comprising: a cylindrical ruby laser rod having a longitudinal axis; a pair of dielectric coated reflecting elements disposed about said laser rod and adapted to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; a copper pedestal plate, one edge of which being adapted to support a longitudinal portion of the surface of said laser rod, said pedestal being thermally insulated from and extending outside said cavity structure in a direction away from said lamp in a plane including both said lamp and said laser rod; and a thin layer of a gallium-lithium alloy disposed between and in contact with said laser rod and said pedestal.

10. A solid-state laser, comprising: a cylindrical ruby laser rod having a longitudinal axis; a pair of dielectric coated reflecting elements disposed about said laser rod and adapted to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; a copper pedestal plate, one edge of which being adapted to support a longitudinal portion of the surface of said laser rod, said pedestal being thermally insulated from and extending outside said cavity structure in a direction away from said lamp in a plane including both said lamp and said laser rod; and a thin layer of a gallium-indium alloy disposed between and in contact with said laser rod and said pedestal.

11. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; pump means including a flash lamp coupled to said laser rod for producing pump energy to excite said rod to a lasing state; a relatively good thermally conductive pump cavity structure enclosing at least substantial portions of said flash lamp and said laser rod for directing said pump energy on said laser rod, a longitudinal portion of the surface of said laser rod being embedded in said cavity structure; and a thin layer of gallium disposed between and in contact with said laser rod and said cavity structure.

12. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; pump means including a flash lamp coupled to said laser rod for producing pump energy to excite said rod to a lasing state; a relatively good thermally conductive pump cavity structure enclosing at least substantial portions of said flash lamp and said laser rod for directing said pump energy on said laser rod, a longitudinal portion of the surface of said laser rod being embedded in said cavity structure; and a thin layer of a gallium-tin alloy disposed between and in contact with said laser rod and said cavity structure.

13. A solid-state laser, comprising: a cylindrical ruby laser rod having longitudinl axis; a pair of reflecting elements disposed about said laser rod to reflect laser energy therethrough essentially parallel to said axis, at least one of said reflecting elements being partially transmissive of said laser energy; pump means including a flash lamp coupled to said laser rod for producing pump energy to excite said rod to a lasing state; a relatively good thermally conductive pump cavity structure enclosing at least substantial portions of said flash lamp and said laser rod for directing said pump energy on said laser rod, a longitudinal portion of the surface of said laser rod being embedded in said cavity structure; and a thin layer of a gallium-lithium alloy disposed between and in contact with said laser rod and said cavity structure.

14. A solid-state laser, comprising: a cylindrical ruby laser rod having a longitudinal axis; a pair of reflecting elements disposed about said laser rod to reflect laser energy therethrough esentially parallel to said axis, at least one of said reflecting elements being partially transmissive of said laser energy; pump means including a flash lamp coupled to said laser rod for producing pump energy to excite said rod to a lasing state; a relatively good thermally conductive pump cavity structure enclosing at least substantial portions of said flash lamp and said laser rod for directing said pump energy on said laser rod, a longitudinal portion of the surface of said laser rod being embedded in said cavity structure; and a thin layer of a gallium-indium alloy disposed between and in contact with said laser rod and said cavity structure.

15. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear flash lamp; an aluminum pump cavity structure including a pumping cavity and having a longitudinal axis substantially parallel to that of said laser rod, said pumping cavity having a highly reflective surface relatively closely surrounding the longitudinal portions of said laser rod and said flash lamp and having a longitudinal groove in said surface parallel to said axis of said pumping cavity when a longitudinal portion of the surface of said laser rod is embedded; and a thin layer of gallium disposed between and in contact with said laser rod and said groove.

16. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear flash lamp; an aluminum pump cavity structure including a pumping cavity and having a longitudinal axis substantially parallel to that of said laser rod, said pumping cavity having a highly reflective surface relatively closely surrounding the longitudinal portions of said laser rod and said flash lamp and having a longitudinal groove in said surface parallel to said axis of said pumping cavity when a longitudinal portion of the surface of said laser rod is embedded; and a thin layer of a gallium-tin alloy disposed between and in contact with said laser rod and said groove.

17. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear flash lamp; an aluminum pump cavity structure including a pumping cavity and having a longitudinal axis substantially parallel to that of said laser rod, said pumping cavity having a highly reflective surface relatively closely surrounding the longitudinal portions of said laser rod and said flash lamp and having a longitudinal groove in said surface parallel to said axis of said pumping cavity when a longitudinal portion of the surface of said laser rod is embedded; and a thin layer of a gallium-lithium alloy disposed between and in contact with said laser rod and said groove.

18. A solid-state laser, comprising: a cylindrical ruby laser rod having a longitudinal axis; a pair of reflecting elements disposed about said laser rod to reflect laser energy therethrough essentially parallel to said axis, at least one of said reflecting elements being partially transmissive of said laser energy; a linear flash lamp; an aluminum pump cavity structure including a pumping cavity and having a longitudinal axis substantially parallel to that of said laser rod, said pumping cavity having a highly reflective surface relatively closely surrounding the longitudinal portions of said laser rod and said flash lamp and having a longitudinal groove in said surface parallel to said axis of said pumping cavity when a longitudinal portion of the surface of said laser rod is embedded; and a thin layer of a gallium-indium alloy disposed between and in contact with said laser rod and said groove.

No references cited.

JEWELL H. PEDERSEN, *Primary Examiner.*

B. J. LACOMIS, *Assistant Examiner.*